United States Patent
Lee et al.

(10) Patent No.: US 9,823,453 B2
(45) Date of Patent: Nov. 21, 2017

(54) CATADIOPTRIC LIGHT-FIELD LENS AND IMAGE PICKUP APPARATUS INCLUDING THE SAME

(71) Applicant: SAMSUNG ELECTRONICS CO., LTD., Suwon-si (KR)

(72) Inventors: Sung-ho Lee, Dangjin-si (KR); Tae-hee Lee, Seoul (KR); Hee-chul Han, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 17 days.

(21) Appl. No.: 14/309,418

(22) Filed: Jun. 19, 2014

(65) Prior Publication Data
US 2015/0168699 A1  Jun. 18, 2015

(30) Foreign Application Priority Data
Dec. 12, 2013  (KR) .......................... 10-2013-0154840

(51) Int. Cl.
*H04N 5/225* (2006.01)
*G02B 17/08* (2006.01)

(52) U.S. Cl.
CPC .................. *G02B 17/0856* (2013.01)

(58) Field of Classification Search
CPC .................................................. G02B 17/0856
USPC .................................................. 348/335, 340
See application file for complete search history.

(56) References Cited

U.S. PATENT DOCUMENTS

| | | | | |
|---|---|---|---|---|
| 4,235,508 A * | 11/1980 | Kaprelian | .......... | G02B 17/0808 359/366 |
| 4,342,503 A * | 8/1982 | Shafer | ............... | G02B 17/0808 359/729 |
| 5,159,495 A * | 10/1992 | Hamblen | ............ | G02B 3/0087 359/654 |
| 5,400,161 A * | 3/1995 | Lambert, Jr. | ...... | G02B 26/0816 250/208.1 |
| 5,471,346 A * | 11/1995 | Ames | ................ | G02B 17/0808 359/364 |
| 2003/0169493 A1* | 9/2003 | Draganov | .......... | G02B 17/0631 359/399 |
| 2007/0188883 A1 | 8/2007 | Seo et al. | | |
| 2007/0249079 A1 | 10/2007 | Sasagawa et al. | | |
| 2007/0263113 A1* | 11/2007 | Baek | ................. | G02B 26/0825 348/340 |
| 2008/0049291 A1* | 2/2008 | Baek | ....................... | G02B 5/10 359/223.1 |

(Continued)

OTHER PUBLICATIONS

Communication dated Jan. 30, 2015 by the International Searching Authority in related application No. PCT/KR2014/010916.

(Continued)

*Primary Examiner* — Sinh Tran
*Assistant Examiner* — Zhenzhen Wu
(74) *Attorney, Agent, or Firm* — Sughrue Mion, PLLC

(57) ABSTRACT

A catadioptric light-field lens has a replaceable micro-mirror array including a plurality of micro-mirrors arranged in concentric rings; a light incidence region formed around the micro-mirror array; a main mirror which is configured to reflect light incident via the light incidence region and concentrate the light at the micro-mirror array; and a light exit region which is formed through the center portion of the main mirror to face the micro-mirror array.

26 Claims, 3 Drawing Sheets

(56) References Cited

U.S. PATENT DOCUMENTS

| | | | | |
|---|---|---|---|---|
| 2008/0273235 | A1* | 11/2008 | Cho | G02B 26/0833 359/226.1 |
| 2009/0135502 | A1* | 5/2009 | Border | G02B 17/0896 359/721 |
| 2009/0295829 | A1 | 12/2009 | Georgiev et al. | |
| 2010/0201781 | A1 | 8/2010 | Trubko et al. | |
| 2011/0128412 | A1 | 6/2011 | Milnes et al. | |
| 2013/0182217 | A1 | 7/2013 | Cheng et al. | |
| 2014/0098277 | A1* | 4/2014 | Nagamatsu | G02B 17/0804 348/335 |
| 2015/0177496 | A1* | 6/2015 | Marks | G02B 13/0065 348/335 |
| 2015/0253469 | A1* | 9/2015 | Le Gros | G02B 3/0006 359/619 |
| 2016/0042522 | A1* | 2/2016 | Wajs | H04N 5/2254 348/335 |

OTHER PUBLICATIONS

"'Folded' Optic Slims High-Res Cameras," Photonics.com, Jan. 31, 2007, http://www.photonics.com/Article.aspx?AID=28295, pp. 1-3.
"Vivitar Series 1 600mm f/8 Solid Catadioptric Lens," http://www.pbase.com/image/42141415, Accessed Jun. 6, 2014, one page.

* cited by examiner

CATADIOPTRIC LIGHT-FIELD LENS AND IMAGE PICKUP APPARATUS INCLUDING THE SAME

CROSS-REFERENCE TO RELATED APPLICATION

This application claims priority from Korean Patent Application No. 10-2013-0154840, filed on Dec. 12, 2013 in the Korean Intellectual Property Office, the disclosure of which is incorporated herein by reference in its entirety.

BACKGROUND

1. Field

Methods and apparatuses consistent with exemplary embodiments relate to a catadioptric light-field lens and an image pickup apparatus including the same, and more particularly, to a catadioptric light-field lens employing a replaceable micro-mirror array and an image pickup apparatus including the same.

2. Description of the Related Art

A general two-dimensional (2D) camera generates an image by obtaining information regarding an intensity of light incident thereto via an objective lens by using an image sensor. For example, information regarding an intensity of light with respect to a single point on an object may be obtained by concentrating a plurality of rays emitted from the point of the object to a point of an image sensor by using an objective lens and accumulating the same for a designated period of time, and a single image may be generated by using information regarding intensity of light obtained from a plurality of pixels of the image sensor. However, a 2D camera cannot obtain information regarding intensities and directions of respective rays from a point of an object.

A light-field technique is used for generating an image of an arbitrary viewpoint or an arbitrary focus by obtaining information regarding intensities and directions of respective rays from a point of an object. By using the light-field technique, a three-dimensional (3D) camera for obtaining information regarding various viewpoints of an object and depth information regarding the object or a refocusing camera that can arbitrarily focus on any objects at a viewing angle may be constructed.

A camera to which light-field technique is applied may include an objective lens and a micro-lens array. For example, a micro-lens array including a plurality of micro-lenses may be arranged between an objective lens and an image sensor.

However, in the related art light-field cameras, a micro-lens array is arranged between an objective lens and an image sensor. Thus, it is difficult to replace or modify the micro-lens array. Further, since the focal length of the micro-lens array is fixed, it is difficult to take pictures with various effects by changing the focal length.

SUMMARY

Exemplary embodiments may address at least the above problems and/or disadvantages and other disadvantages not described above. The exemplary embodiments are not required to overcome the disadvantages described above, and may not overcome any of the problems described above.

According to an aspect of an exemplary embodiment, there is provided a catadioptric light-field lens including a micro-mirror array including a plurality of micro-mirrors arranged as concentric rings; a light incidence region formed around the micro-mirror array; a main mirror, which reflects light incident via the light incidence region and concentrates the light at the micro-mirror array; and a light exit region, which is formed through the center portion of the main mirror to face the micro-mirror array.

The main mirror may include a reflection plate arranged to face the micro-mirror array, and the light exit region may be formed through the center portion of the reflection plate.

The catadioptric light-field lens may further include a lens arranged at the light exit region of the center portion of the reflection plate.

The lens may be a field flattening lens for flattening an image formed on a focal plane.

The catadioptric light-field lens may further include a corrector plate, which may be arranged at the light incidence region around the micro-mirror array for correcting aberration of the micro-mirror array and the main mirror.

The reflection plate may have a concave reflection surface.

The main mirror may include a first reflection plate and a second reflection plate having reflection surfaces facing each other, the light exit region may be formed through the center portion of the first reflection plate, the micro-mirror array may be arranged through the center portion of the second reflection plate, and the light incidence region may be formed around the second reflection plate.

The catadioptric light-field lens may further include an inclined mirror, which may be arranged around the first reflection plate to reflect light incident via the light incidence region toward the second reflection plate; and a sidewall, which may be arranged around the inclined mirror to define the light incidence region.

The catadioptric light-field lens may further include a driven mirror, which may be arranged adjacent to the light exit region on the first reflection plate to directly reflect light reflected by the second reflection plate toward the micro-mirror array and has a deformable reflection surface.

The driven mirror may be a deformable mirror that may be deformable via mechanical or electrical manipulation.

The driven mirror may be a micro-mirror array including a plurality of micro-mirrors that may be to be electrostatically driven.

The micro-mirror array and the light exit region may be arranged on an optical axis of the catadioptric light-field lens.

The micro-mirror array may be configured to be able to move in a direction of an optical axis OX of the catadioptric light-field lens.

Reflection surfaces of the plurality of micro-mirrors of the micro-mirror array may have curved concave surfaces.

The reflection surfaces of the plurality of micro-mirrors of the micro-mirror array have at least two different curvatures.

The reflection surfaces of the plurality of micro-mirrors of the micro-mirror array have at least two different diameters.

The curvatures or the diameters of the reflection surfaces of the plurality of micro-mirrors of the micro-mirror array increase or decrease as distances therefrom to an optical axis OX of the catadioptric light-field lens increase.

The micro-mirror array may include a main body which has a flat surface facing the light exit region, and the plurality of micro-mirrors may be arranged on the flat surface of the main body as concentric rings.

The micro-mirror array may include a main body which has a concave surface facing the light exit region, and the plurality of micro-mirrors may be arranged on the concave surface of the main body as concentric rings.

The plurality of micro-mirrors arranged as concentric rings may be divided into at least two segments in the circumferential direction.

According to an aspect of another exemplary embodiment, there is provided an image pickup apparatus including a catadioptric light-field lens; and an image sensor, which is arranged at a light exit region of the catadioptric light-field lens and includes a plurality of two-dimensionally arranged pixels, wherein the catadioptric light-field lens includes a micro-mirror array including a plurality of micro-mirrors arranged as concentric rings; a light incidence region formed around the micro-mirror array; a main mirror, which reflects light incident via the light incidence region and concentrates the light at the micro-mirror array; and a light exit region, which is formed through the center portion of the main mirror to face the micro-mirror array.

The image sensor is arranged on the focal plane of the micro-mirror array.

BRIEF DESCRIPTION OF THE DRAWINGS

The above and/or other aspects will become more apparent by describing certain exemplary embodiments with reference to the accompanying drawings, in which.

DETAILED DESCRIPTION

Figure 1:
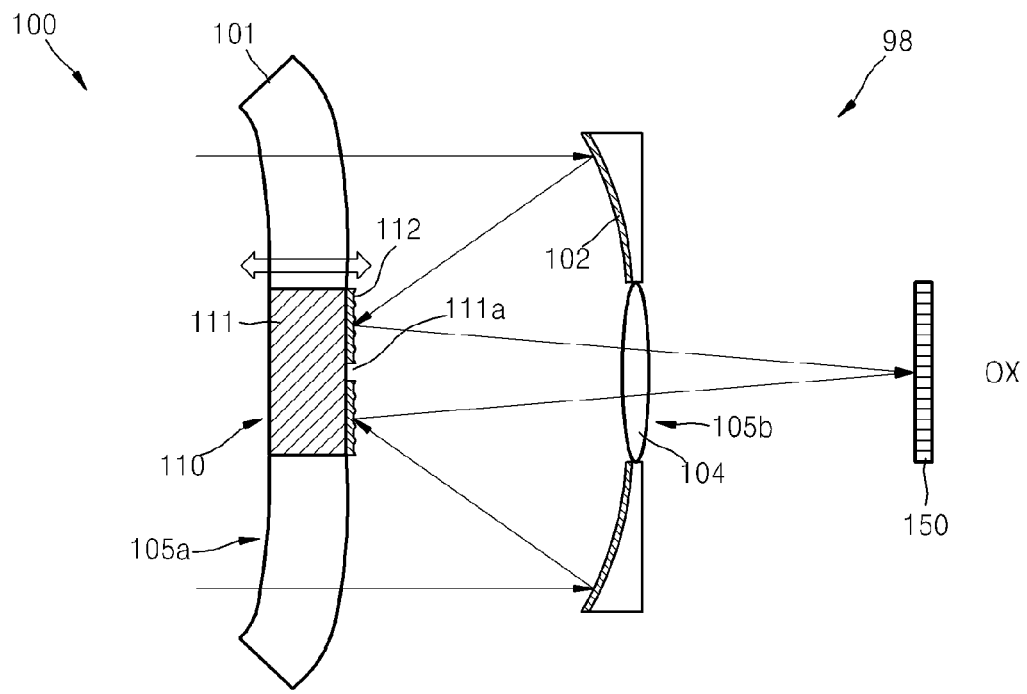
FIG. 1 is a schematic sectional diagram showing configurations of a catadioptric light-field lens and an image pickup apparatus including the same, according to an exemplary embodiment.

Certain exemplary embodiments are described in greater detail below with reference to the accompanying drawings.

In the following description, like drawing reference numerals are used for the like elements, even in different drawings. The matters defined in the description, such as detailed construction and elements, are provided to assist in a comprehensive understanding of exemplary embodiments. However, exemplary embodiments can be practiced without those specifically defined matters. Also, well-known functions or constructions are not described in detail since they would obscure the application with unnecessary detail.

In the drawings, lengths and sizes of layers and regions may be exaggerated for clarity. It will be understood that when an element or layer is referred to as being "on" another element or layer, the element or layer can be directly on the other element or layer or intervening elements or layers may be present thereon.

FIG. 1 is a schematic sectional diagram showing configurations of a catadioptric light-field lens 100 and an image pickup apparatus 98 including the same, according to an exemplary embodiment. Referring to FIG. 1, the catadioptric light-field lens 100 according to the present exemplary embodiment may include a micro-mirror array 110, which includes a plurality of micro-mirrors 112, a light incidence region 105a formed around the micro-mirror array 110, a reflection plate 102, which reflects light incident via the light incidence region 105a to the micro-mirror array 110, and a light exit region 105b, which is arranged through the center portion of the reflection plate 102 to face the micro-mirror array 110.

As shown in FIG. 1, an image pickup apparatus according to the present exemplary embodiment may include the catadioptric light-field lens 100 having the structure described above and an image sensor 150, which is arranged to face the light exit region 105b of the catadioptric light-field lens 100 and includes a plurality of two-dimensionally arranged pixels. The image sensor 150 may be a charge-coupled device (CCD) image sensor or a complementary metal oxide semiconductor (CMOS) image sensor.

The reflection plate 102 may function as a primary mirror, i.e., main mirror, which reflects light incident via the light incidence region 105a and concentrates the light on the micro-mirror array 110. To this end, the single reflection plate 102 having a concave reflection surface may be arranged between the micro-mirror array 110 and the image sensor 150. In other words, the micro-mirror array 110 may be arranged at the object side of the catadioptric light-field lens 100, whereas the reflection plate 102 may be arranged at the image side of the catadioptric light-field lens 100. The concave reflection surface of the reflection plate 102 may be arranged to face the micro-mirror array 110.

A via hole may be formed at the center portion of the reflection plate 102, such that a light reflected by the micro-mirror array 110 may reach the image sensor 150. The via hole penetrating the center portion of the reflection plate 102 may define the light exit region 105b of the catadioptric light-field lens 100. As shown in FIG. 1, the micro-mirror array 110, the light exit region 105b, and the image sensor 150 may be arranged on an optical axis OX of the catadioptric light-field lens 100. Although FIG. 1 shows that the image sensor 150 is a designated distance apart from the light exit region 105b in a direction coinciding with a direction of the optical axis OX of the catadioptric light-field lens 100, the present exemplary embodiment is not limited thereto. A position of the image sensor 150 in the direction of the optical axis OX may be determined based on the focal length of the micro-mirror array 110. For example, the image sensor 150 may be arranged on the focal plane of the micro-mirror array 110.

The catadioptric light-field lens 100 may further include a lens 104 arranged at the light exit region 105b of the center portion of the reflection plate 102. For example, the lens 104 may be a field flattening lens for flattening an image formed on the focal plane of the micro-mirror array 110. Although the image sensor 150 has a flat surface, reflection surfaces of the reflection plate 102 and the micro-mirror array 110 are spherical surfaces. Therefore, an image formed at the image sensor 150 may be distorted due to spherical aberration. The lens 104 may correct spherical aberration, thereby minimizing distortion of an image formed at the image sensor 150.

The catadioptric light-field lens 100 may further include a transparent corrector plate 101 arranged at the light incidence region 105a around the micro-mirror array 110. For example, the transparent corrector plate 101 may correct various aberration of the reflection plate 102 and the micro-mirror array 110 including spherical aberration. The transparent corrector plate 101 may be configured to provide aberration opposite to aberration of the reflection plate 102 and the micro-mirror array 110 to light before the light strikes the reflection plate 102. The transparent corrector plate 101 may have a complicated aspheric shape, for example.

The micro-mirror array 110 may include a cylindrical main body 111, which is centered on the optical axis OX, and the plurality of micro-mirrors 112 arranged on a surface of the main body 111. Although FIG. 1 shows that the plurality of micro-mirrors 112 are divided into two portions, the plurality of micro-mirrors 112 may be arranged as a plurality of rings as concentric circles.

Figure 2:
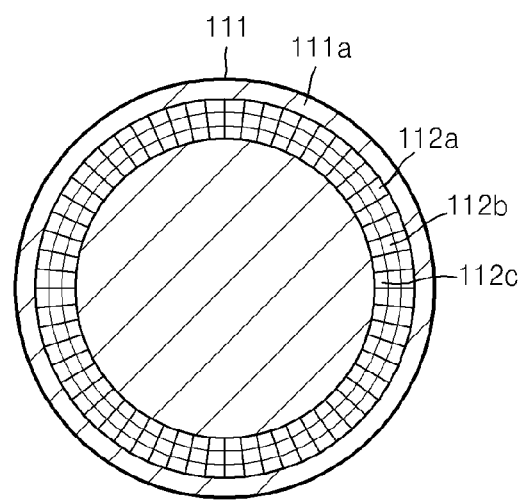
FIG. 2 is a schematic plan view showing the configuration of a micro-mirror array according to an exemplary embodiment.

For example, FIG. 2 is a plan view showing the configuration of the micro-mirror array 110 according to an exemplary embodiment shown in FIG. 1. Referring to FIG. 2, the plurality of micro-mirrors 112 may be arranged at a plurality of concentric rings 112a, 112b, and 112c on a surface 111a of the main body 111 facing the light exit region 105b (that is, facing the image side). Although FIG. 2 shows three concentric rings 112a, 112b, and 112c, the number of concentric rings at which the micro-mirrors 112 are arranged is not limited. For example, the number of the concentric rings may be two, four, five, or more. Furthermore, at each of the concentric rings 112a, 112b, and 112c, the plurality of small micro-mirrors 112 may be arranged adjacent to one another. As further example, the micro-mirrors 112 may be disposed at the center portion of the surface 111a of the main body 111.

Figure 3:
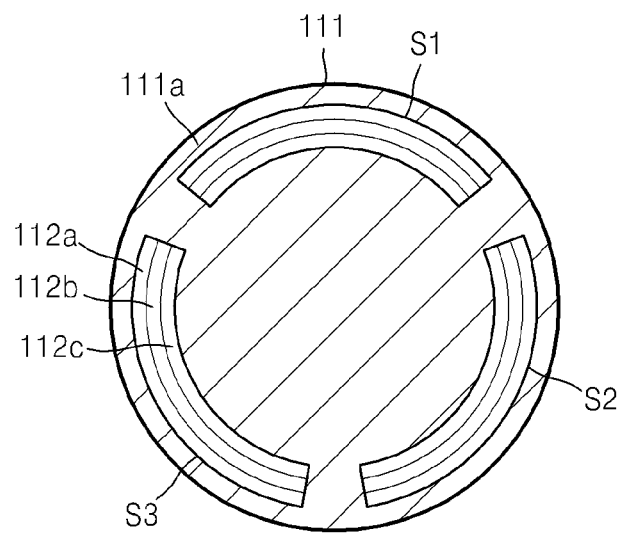
FIG. 3 is a schematic plan view showing the configuration of a micro-mirror array according to an exemplary embodiment.

FIG. 3 is a schematic plan view showing the configuration of the micro-mirror array 110 according to an exemplary embodiment. In FIG. 2, the plurality of micro-mirrors 112 are arranged to be completely connected to one another in the circumferential direction. However, as shown in FIG. 3, the plurality of micro-mirrors 112 arranged as concentric rings may be divided into at least two segments, for example, segments S1, S2, and S3, in the circumferential direction. Although FIG. 3 shows that there are three segments S1, S2, and S3, the micro-mirrors 112 may be divided into two, four, five, or more segments. In FIG. 3, each of the segments S1, S2, and S3 of each of the concentric rings 112a, 112b, and 112c may include the plurality of micro-mirrors 112 arranged adjacent to one another or a single continuous micro-mirror.

Reflection surfaces of the plurality of micro-mirrors 112 of the micro-mirror array 110 may be concave surfaces, as shown in FIG. 1, to concentrate lights reflected to the image sensor 150. According to the present exemplary embodiment, to obtain various images with different focal lengths via a single image capturing, the reflection surfaces of the plurality of micro-mirrors 112 may have different curvatures and diameters. For example, the reflection surfaces of the plurality of micro-mirrors 112 may have at least two different curvatures or at least two different diameters. The micro-mirrors 112 arranged at each of the concentric circular rings 112a, 112b, and 112c shown in FIGS. 2 and 3 are disposed at different positions to each other with respect to the optical axis OX of the catadioptric light-field lens 100. For efficient and precise light concentration, the reflection surfaces of the micro-mirrors 112 may have different curvatures or different diameters based on distances from the optical axis OX of the catadioptric light-field lens 100. For example, the further the reflection surfaces of the plurality of micro-mirrors 112 are from the optical axis OX, the larger (or the smaller) the curvatures or the diameters of the reflection surfaces of the plurality of micro-mirrors 112 may be.

Figure 4:
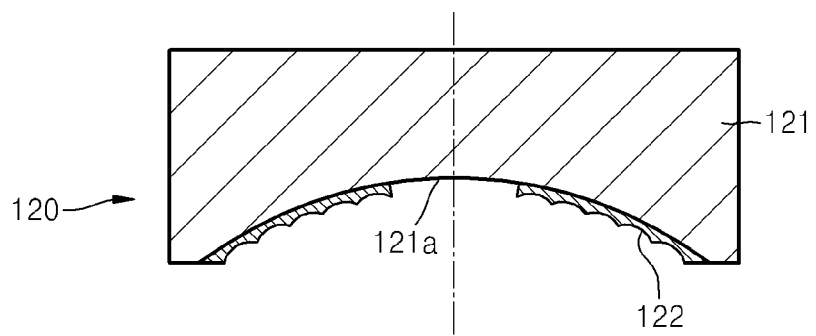
FIG. 4 is a schematic sectional view showing the configuration of a micro-mirror array of the catadioptric light-field lens, according to an exemplary embodiment.

FIG. 4 is a schematic sectional view showing the configuration of a micro-mirror array 120 of the catadioptric light-field lens 100, according to an exemplary embodiment. In FIG. 1, the main body 111 of the micro-mirror array 110 includes the flat surface 111a facing the light exit region 105b (that is, facing the image side), and the plurality of micro-mirrors 112 are arranged on the flat surface 111a as concentric rings. The micro-mirror array 120 shown in FIG. 4 may include a main body 121 having a curved surface 121a for improved light concentration efficiency. For example, the surface 121a arranged to face the image side may have a curved concave surface, and a plurality of micro-mirrors 122 may be arranged on the curved concave surface as concentric rings. In this case, not only each of the micro-mirror 122 has a concave reflection surface, but also the micro-mirror array 120 is formed to have an overall concave shape. Therefore, light concentration efficiency of the micro-mirror array 120 may be further improved.

Referring back to FIG. 1, the micro-mirror array 110 may also be configured to be able to move in the direction substantially parallel to that of the optical axis OX, as indicated by an arrow in FIG. 1. By moving the micro-mirror array 110 in the direction of the optical axis OX, focus may be controlled and a zoom function may be provided to the catadioptric light-field lens 100. For example, the micro-mirror array 110 may be moved in the direction of the optical axis OX by using a driver and/or a motor (not shown).

When the micro-mirror array 110 moves in the direction of the optical axis OX, a distance between the micro-mirror array 110 and the image sensor 150 changes. Therefore, curvatures of the reflection surfaces of the micro-mirrors 112 may be deformed for precise focus control. For example, the micro-mirrors 112 may be deformable mirrors of which reflection surfaces may be deformed to arbitrary shapes via mechanical or electrical manipulation. To this end, the reflection surface of the micro-mirror 112 may be formed of a flexible member, where fine electrical or mechanical devices for deforming the reflection surface by locally pulling or pushing the reflection surface may be arranged on a rear surface of the flexible member as a 2D array. For example, a plurality of piezoelectric actuators may be two-dimensionally arranged on the flexible reflection surface of the micro-mirror 112. Alternatively, the micro-mirrors 112 may be fabricated to be electrostatically driven by using a micro electro-mechanical system (MEMS) technique. This technical feature may be also applied to the micro-mirror array 120 shown in FIG. 4.

Figure 5:
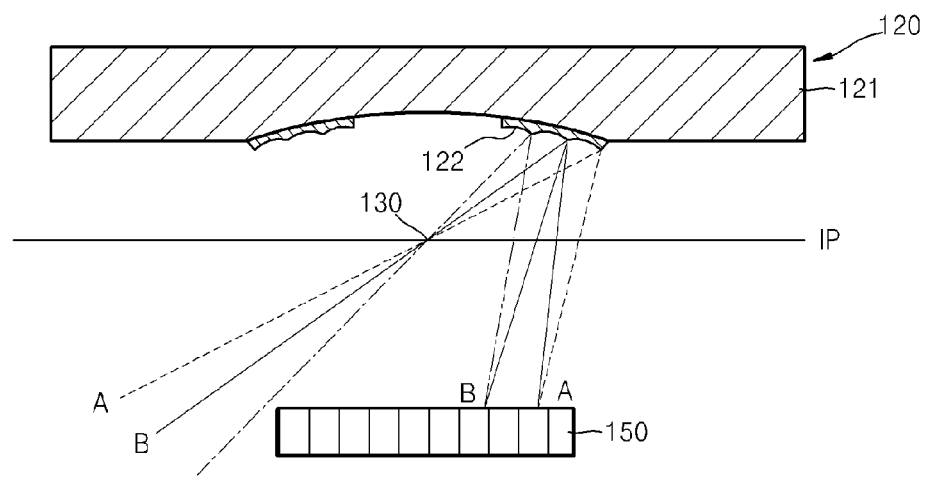
FIG. 5 is a diagram for describing an application of a light-field technique by using the micro-mirror array.

FIG. 5 is a diagram for describing how a light-field technique is embodied by using the micro-mirror array 120 shown in FIG. 4. Generally, a light-field technique is embodied by using one main lens having a positive refractive power and one micro-lens array having a positive refractive power. Both a convex lens and a concave mirror have positive refractive power for concentrating light, and images are formed thereby in opposite directions. The micro-lens array may be positioned on the image plane of the objective lens, and the image sensor may be positioned at a focal length of the micro-lens array. A camera configured as described above is referred to as a plenoptic 1.0 camera. Image resolution of a plenoptic camera may be improved by positioning a micro-lens array in front of or behind the image plane of an objective lens, and positioning an image sensor at a focal length of the micro-lens array. A camera configured as described above is referred to as a plenoptic 2.0 camera.

Due to the similar optical properties, a light-field technique may be embodied by using a main mirror and a micro-mirror array instead of a main lens and a micro-lens array.

Referring to FIG. 5, the micro-mirror array 120 is arranged apart from the image plane IP of a main mirror (not shown). Light rays A and B from different viewpoints may be focused at one point 130 on the image plane IP of the main mirror and may be concentrated at different points of the image sensor 150 via the plurality of micro-mirrors 122. Therefore, the same effect as that of the case in which one main lens having a positive refractive power and one micro-lens array having a positive refractive power are used may be obtained. However, since a lens and a mirror form an image in opposite directions, a main lens and a micro-lens array are respectively arranged at the object side and the image side, whereas a main mirror and a micro-mirror array are respectively arranged at the image side and the object side. Arrangement of FIG. 5 may correspond to a plenoptic 2.0 technique. However, an exemplary embodiment may also be applied to a plenoptic 1.0 technique in which the micro-mirror array 120 may be arranged on the image plane of a main mirror.

In the catadioptric light-field lens 100 according to the present exemplary embodiment as described above, since the micro-mirror array 110 and the micro-mirror array 120 are arranged at the front-most position of the catadioptric light-field lens 100 (that is, the object side), the micro-mirror array 110 and the micro-mirror array 120 may be easily replaced. Therefore, images with various effects may be captured by changing focal lengths by alternately using a plurality of micro-mirror arrays 110 and 120 having various focal lengths. Furthermore, focus may be easily controlled or a zooming function may be easily provided by moving the micro-mirror arrays 110 and 120 in the direction of the optical axis.

Figure 6:
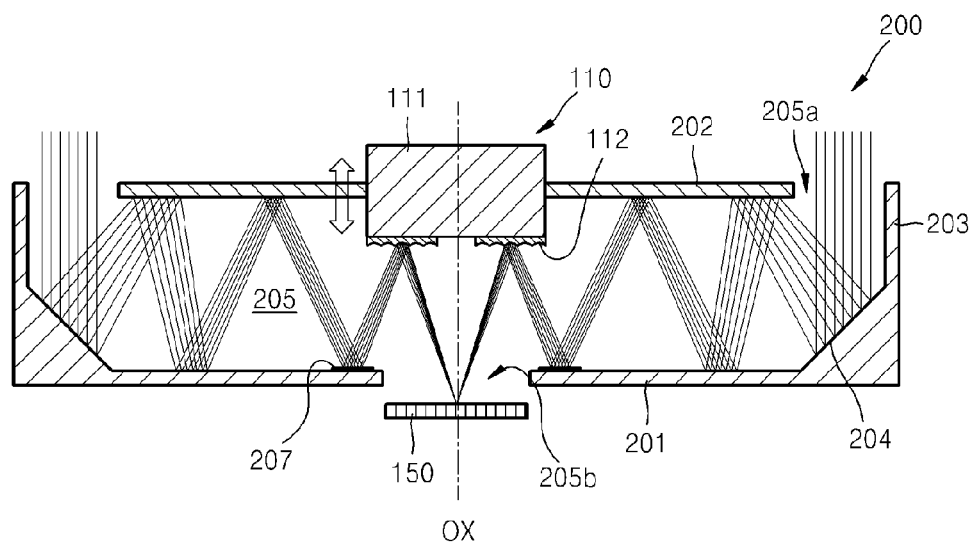
FIG. 6 is a schematic sectional diagram showing configurations of a catadioptric light-field lens and an image pickup apparatus including the same, according to an exemplary embodiment.

FIG. 6 is a schematic sectional diagram showing configurations of a catadioptric light-field lens 200 and an image pickup apparatus including the same, according to an exemplary embodiment. The catadioptric light-field lens 100 shown in FIG. 1 includes one reflection plate having a concave reflection surface as a main mirror. On the contrary, the catadioptric light-field lens 200 shown in FIG. 6 employs a folded optics structure, in which a light traveling path is folded for a number of times, i.e., bounces, between first and second reflection plates 201 and 202, acting as a main mirror. In the catadioptric light-field lens 200 shown in FIG. 6, a thickness of the catadioptric light-field lens 200 may be substantially reduced by extending a light traveling path by using two reflection plates facing each other. In other words, a thickness of the catadioptric light-field lens 200 may be controlled to be a thickness within a distance between the first and second reflection plates 201 and 202, regardless a focal length. For example, a distance between the first and second reflection plates 201 and 202 is less than 10 mm, for example, 5 mm. Therefore, an image pickup apparatus according to the present exemplary embodiment may be easily used in a thin mobile device.

In detail, referring to FIG. 6, a main mirror of the catadioptric light-field lens 200 may include the first reflection plate 201 and the second reflection plate 202, which have reflection surfaces facing each other. A light exit region 205b is formed through the center portion of the first reflection plate 201, whereas a light incidence region 205a may be arranged as a ring around the second reflection plate 202. The micro-mirror array 110 may be arranged through the center portion of the second reflection plate 202. Instead of the micro-mirror array 110 shown in FIG. 6, the micro-mirror array 120 shown in FIG. 4 may be arranged. Configurations and operations of the micro-mirror array 110 and the micro-mirror array 120 are identical to those described above.

The catadioptric light-field lens 200 may further include a sidewall 203 arranged around the catadioptric light-field lens 200 to define the light incidence region 205a. The first reflection plate 201, the second reflection plate 202, and the sidewall 203 may form a space 205 inside the catadioptric light-field lens 200, in which light may travel. The space 205 may be filled with air or may be filled with transparent glass or transparent plastic.

The catadioptric light-field lens 200 may further include an inclined mirror 204 arranged around the first reflection plate 201 to reflect light incident via the light incidence region 205a toward the second reflection plate 202 in an angled direction. The sidewall 203 may be arranged around the inclined mirror 204. In other words, the inclined mirror 204 may be arranged to be inclined between the first reflection plate 201 and the sidewall 203.

In the structure described above, light incident via the light incidence region 205a is first reflected by the inclined mirror 204 arranged to face the light incidence region 205a. Then, the light is incident to the reflection surface of the second reflection plate 202 in an angled direction. Then, the light is repeatedly reflected between the second reflection plate 202 and the first reflection plate 201 and gradually travels toward the center of the catadioptric light-field lens 200. During the process, the light may concentrate more and more. Finally, the light may be reflected by the micro-mirror array 110 at the center of the second reflection plate 202, emitted to outside via the light exit region 205b at the center of the first reflection plate 201, and may reach the image sensor 150.

The micro-mirror array 110 may move in a direction of the optical axis OX of the catadioptric light-field lens 200, but the first and second reflection plates 201 and 202 are fixed. Therefore, if the micro-mirror array 110 moves, light finally reflected by the first reflection plate 201 may reach the micro-mirror array 110 imprecisely. To prevent this problem, the catadioptric light-field lens 200 may further include a driven mirror 207. The driven mirror 207 may be arranged adjacent to the light exit region 205b on the first reflection plate 201 to directly reflect light reflected by the second reflection plate 202 toward the micro-mirror array 110. The driven mirror 207 controls an angle at which light is reflected, such that the light precisely reaches the micro-mirror array 110 even if the micro-mirror array 110 moves. To this end, the driven mirror 207 may have a deformable reflection surface. For example, the driven mirror 207 may be a deformable mirror that may be deformed to arbitrary shapes via mechanical or electrical manipulation. Alternatively, the driven mirror 207 may be fabricated to be electrostatically driven by using an MEMS technique. For example, the driven mirror 207 may be a micro-mirror array including a plurality of micro-mirrors that may be electrostatically driven.

The foregoing exemplary embodiments and advantages are merely exemplary and are not to be construed as limiting. The present exemplary teaching can be readily applied to other types of apparatuses. The description of the exemplary embodiments is intended to be illustrative, and not to limit the scope of the claims, and many alternatives, modifications, and variations will be apparent to those skilled in the art.

What is claimed is:

1. A catadioptric light-field lens comprising:
   a micro-mirror array including a main body and a plurality of micro-mirrors arranged in concentric rings centered on an optical axis of the catadioptric light-field lens, the main body of the micro-mirror array being centered on the optical axis, the main body having a first surface, a second surface opposite to the first surface and a side surface, and the plurality of micro-mirrors being arranged on the first surface of the main body of the micro-mirror array;
   a corrector plate arranged at a light incidence region and formed around the side surface of the main body of the micro-mirror array;
   a main mirror which is configured to reflect light incident via the light incidence region and concentrate the light on the micro-mirror array; and
   a light exit region which is formed through a center portion of the main mirror to face the micro-mirror array,
   wherein reflection surfaces of the plurality of micro-mirrors arranged on the first surface of the main body of the micro-mirror array have curved concave surfaces, and
   wherein curvatures or diameters of the reflection surfaces of the plurality of micro-mirrors gradually increase or decrease as corresponding distances of the plurality of micro-mirrors to the optical axis increase, so as to generate multiple images having different focal lengths.

2. The catadioptric light-field lens of claim 1, wherein the main mirror comprises a reflection plate arranged to face the micro-mirror array, and
   the light exit region is formed through a center portion of the reflection plate.

3. The catadioptric light-field lens of claim 2, further comprising:
   a lens arranged at a via hole formed at the center portion of the reflection plate.

4. The catadioptric light-field lens of claim 3, wherein the lens is a field flattening lens configured to flatten an image formed on a focal plane.

5. The catadioptric light-field lens of claim 2, wherein the corrector plate is configured to correct aberration of at least one of the micro-mirror array and the main mirror.

6. The catadioptric light-field lens of claim 2, wherein the reflection plate has a concave reflection surface.

7. The catadioptric light-field lens of claim 1, wherein the main mirror comprises a first reflection plate and a second reflection plate having reflection surfaces facing each other,
   the light exit region is formed through a center portion of the first reflection plate,
   the micro-mirror array is arranged at a center portion of the second reflection plate, and
   the light incidence region is formed around the second reflection plate.

8. The catadioptric light-field lens of claim 7, further comprising:
   an inclined mirror which is arranged around the first reflection plate and configured to reflect light incident via the light incidence region toward the second reflection plate; and
   a sidewall which is arranged around the inclined mirror to define the light incidence region.

9. The catadioptric light-field lens of claim 7, further comprising:
   a driven mirror which is arranged adjacent to the light exit region on the first reflection plate and configured to directly reflect light reflected by the second reflection plate toward the micro-mirror array, wherein the driven mirror has a deformable reflection surface.

10. The catadioptric light-field lens of claim 9, wherein the driven mirror is a deformable mirror that is deformable via mechanical or electrical manipulation.

11. The catadioptric light-field lens of claim 9, wherein the driven mirror is a micro-mirror array including a plurality of micro-mirrors configured to be electrostatically driven.

12. The catadioptric light-field lens of claim 1, wherein the light exit region is arranged on the optical axis of the catadioptric light-field lens.

13. The catadioptric light-field lens of claim 1, wherein the micro-mirror array is configured to be movable in a direction substantially parallel to the optical axis of the catadioptric light-field lens.

14. The catadioptric light-field lens of claim 1, wherein the reflection surfaces of the plurality of micro-mirrors have at least two different curvatures.

15. The catadioptric light-field lens of claim 1, wherein the reflection surfaces of the plurality of micro-mirrors have at least two different diameters.

16. The catadioptric light-field lens of claim 1, wherein the first surface of the main body of the micro-mirror array includes a flat surface facing the light exit region, and
   the plurality of micro-mirrors are arranged on the flat surface of the main body in concentric rings.

17. The catadioptric light-field lens of claim 1, wherein the first surface of the main body of the micro-mirror array includes a concave surface facing the light exit region, and
   the plurality of micro-mirrors are arranged on the concave surface of the main body in concentric rings.

18. The catadioptric light-field lens of claim 1, wherein the plurality of micro-mirrors arranged in the concentric rings are divided into at least two segments in the circumferential direction.

19. An image pickup apparatus comprising:
   a catadioptric light-field lens; and
   an image sensor which is arranged at a light exit region of the catadioptric light-field lens and includes a plurality of two-dimensionally arranged pixels,
   wherein the catadioptric light-field lens comprises:
   a micro-mirror array including a main body and a plurality of micro-mirrors arranged in concentric rings centered on an optical axis of the catadioptric light-field lens, the main body of micro-mirror array being centered on the optical axis, the main body having a first surface, a second surface opposite to the first surface and a side surface, and the plurality of micro-mirrors being arranged on the first surface of the main body of the micro-mirror array;
   a corrector plate arranged at a light incidence region and formed around the side surface of the main body of the micro-mirror array;
   a main mirror configured to reflect light incident via the light incidence region and concentrate the light on the micro-mirror array; and
   a light exit region which is formed through a center portion of the main mirror to face the micro-mirror array,
   wherein reflection surfaces of the plurality of micro-mirrors of the micro-mirror array have curved concave surfaces, and
   wherein curvatures or diameters of the reflection surfaces of the plurality of micro-mirrors gradually increase of decrease as corresponding distances of the plurality of micro-mirrors to the optical axis increase, so as to generate multiple images having different focal lengths.

20. The image pickup apparatus of claim 19, wherein the image sensor is arranged on a focal plane of the micro-mirror array.

21. A catadioptric light-field lens comprising:
a micro-mirror array including a main body and micro-mirrors which are configured to be movable and are disposed proximate to an object, the main body having a first surface, a second surface opposite to the first surface and a side surface, the micro-mirrors being arranged on the first surface of the main body of the micro-mirror array;
a corrector plate arranged at a light incidence region and formed around the side surface of the main body of the micro-mirror array and through which light reflected from the object passes;
a main mirror assembly configured to direct light, which has passed through the light incidence region, to the micro-mirrors; and
a light exit region which is formed through the main mirror assembly and is aligned with the micro-mirrors,
wherein the micro-mirrors are arranged in concentric rings centered on an optical axis of the catadioptric light-field lens,
wherein reflection surfaces of the micro-mirrors have curved concave surfaces, and
wherein curvatures or diameters of the reflection surfaces of the micro-mirrors gradually decrease as corresponding distances of the micro-mirrors to the optical axis of the catadioptric light-field lens increase, so as to generate multiple images having different focal lengths.

22. The catadioptric light-field lens of claim 21, wherein the main mirror assembly comprises:
a first reflection plate which is disposed distal from the object and has a first center region which contains the light exit region; and
a second reflection plate which is disposed proximate to the object and has a second center region which contains the micro-mirrors,
wherein the light, which has passed through the incidence region, is configured to bounce between the first reflection plate and the second reflection plate, from an outer circumference of the first and second reflection plates toward the first and second center regions, to be directed to and collected by the micro-mirrors.

23. An image pickup apparatus comprising:
the catadioptric light-field lens of claim 22; and
an image sensor which is aligned with the light exit region and is disposed proximate the second plate of the main mirror assembly so that the second plate is disposed between the micro-mirrors and the image sensor.

24. The catadioptric light-field lens of claim 1, wherein the main body of the micro-mirror array has a cylindrical shape.

25. The image pickup apparatus of claim 19, wherein the main body of the micro-mirror array has a cylindrical shape.

26. The catadioptric light-field lens of claim 21, wherein the main body of the micro-mirror array has a cylindrical shape.

* * * * *